(12) United States Patent
Takahashi

(10) Patent No.: US 11,652,937 B2
(45) Date of Patent: May 16, 2023

(54) IMAGE FORMING APPARATUS

(71) Applicant: CANON KABUSHIKI KAISHA, Tokyo (JP)

(72) Inventor: Shun Takahashi, Ibaraki (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 17/485,019

(22) Filed: Sep. 24, 2021

(65) Prior Publication Data
US 2022/0103708 A1   Mar. 31, 2022

(30) Foreign Application Priority Data

Sep. 29, 2020 (JP) .............................. JP2020-164110

(51) Int. Cl.
*H04N 1/00* (2006.01)

(52) U.S. Cl.
CPC ..... *H04N 1/00557* (2013.01); *H04N 1/00559* (2013.01); *H04N 1/00798* (2013.01); *H04N 2201/0094* (2013.01)

(58) Field of Classification Search
CPC ....... H04N 17/002; H04N 2201/02485; H04N 2201/0456; H04N 5/2251; H04N 5/2259; H04N 5/23238; H04N 5/232411; H04N 5/2352; H04N 7/18; H04N 9/04515; B65H 2405/332; B65H 1/28; B65H 1/266; B65H 2801/06; B65H 1/04; B65H 2601/322; B65H 3/0684; B65H 3/0669; G03G 15/80; G03G 21/1604; G03G 21/1652; G03G 21/1666; G03G 15/04036; G03G 21/1647; G03G 15/04054; G03G 15/04; G03G 2221/1654; G03G 15/0435; G03G 21/00; G03G 21/0029; G03G 21/1671; G03G 21/169; G03G 15/0225; G03G 15/087; G03G 15/0409; G03G 15/0415;
(Continued)

(56) References Cited

U.S. PATENT DOCUMENTS

| 8,513,547 B2 * | 8/2013 | Ooi ........................ G06F 3/0317 178/18.09 |
| 8,831,502 B2 * | 9/2014 | Kohara .............. G03G 15/6502 399/81 |

(Continued)

FOREIGN PATENT DOCUMENTS

JP         2003241443 A         8/2003

*Primary Examiner* — Negussie Worku
(74) *Attorney, Agent, or Firm* — Canon U.S.A., Inc. I.P. Division

(57) ABSTRACT

An image forming apparatus includes an image forming unit, an image reading unit disposed on the image forming unit, a first control circuit board mounted on the image reading unit, a second control circuit board mounted on the image forming unit, a flexible flat cable, a slit, and a regulating member. The flexible flat cable transfers image data from the first control circuit board to the second control circuit board and has one end connected to the first control circuit board and another end connected to the second control circuit board. The slit is formed in the image forming unit such that the flexible flat cable passes through. The regulating member regulates a length of the flexible flat cable between the slit and the second connector, is attached at a predetermined position of the flexible flat cable, and abuts against the image forming unit.

6 Claims, 8 Drawing Sheets

(58) Field of Classification Search
CPC .......... G03G 21/10; G03G 2215/0409; G03G 2221/1636; G03G 15/0258; G03G 15/6511; G03G 15/6573; G03G 21/16; H05K 1/14
USPC ........................................................ 358/474
See application file for complete search history.

(56) References Cited

U.S. PATENT DOCUMENTS

| | | | | |
|---|---|---|---|---|
| 9,184,522 | B1* | 11/2015 | Savoy | H01R 12/79 |
| 11,106,173 | B2* | 8/2021 | Sekiya | G03G 15/80 |
| 11,546,480 | B2* | 1/2023 | Nishida | G03G 15/605 |
| 2007/0273899 | A1* | 11/2007 | Yazawa | B41J 2/2132 |
| | | | | 358/1.4 |
| 2010/0209140 | A1* | 8/2010 | Kamimura | G03G 15/75 |
| | | | | 399/111 |
| 2014/0276068 | A1* | 9/2014 | Szpak | A61B 8/145 |
| | | | | 128/845 |
| 2016/0277615 | A1* | 9/2016 | Shimizu | H04N 1/486 |
| 2016/0295042 | A1* | 10/2016 | Akimatsu | G06F 3/1203 |
| 2019/0082074 | A1* | 3/2019 | Takayama | G03G 15/0258 |
| 2021/0165358 | A1* | 6/2021 | Sekiya | H05K 1/14 |
| 2022/0038583 | A1* | 2/2022 | Yamasaki | H04N 1/0083 |

* cited by examiner

IMAGE FORMING APPARATUS

BACKGROUND

Field

The present disclosure relates to an image forming apparatus including an image reading unit that reads document images and an image forming unit that forms the images on sheets.

Description of the Related Art

A multi-functional peripheral (MFP) having a copy function or a print function includes an image forming unit and an image reading unit disposed thereon. The image reading unit is, for example, an automatic document feeder (ADF) or a scanner. For such an image forming apparatus including an image reading unit, a flexible flat cable (FFC) is used, for example, for transfer of image data between the image reading unit and the image forming unit.

According to Japanese Patent Application Laid-Open No. 2003-241443, an FFC as described above is wired from an image reading unit to an image forming unit via an opening formed on an upper surface of the image forming unit and is connected to a connector inside the image forming unit. With this configuration, by removing the cable from the connector inside the image forming unit, the image reading unit can be detached easily.

There is a product having a short wiring path for an FFC connecting an image reading unit and an image forming unit, which often generates an excessive cable length. If an extra portion of such an FFC is located in the vicinity of a connector of a control circuit board of the image forming unit, stress is applied to the FFC, and the FFC may be disconnected or damaged.

SUMMARY

The present disclosure is directed to preventing a flexible flat cable from being disconnected and damaged.

According to an aspect of the present disclosure, an image forming apparatus includes an image forming unit configured to form a sheet image on a sheet, an image reading unit configured to read a document image on a document, wherein the image reading unit is disposed on the image forming unit, a first control circuit board that is mounted on the image reading unit, a second control circuit board that is mounted on the image forming unit, a flexible flat cable configured to transfer image data from the first control circuit board to the second control circuit board, wherein the flexible flat cable has one end connected to a first connector mounted on the first control circuit board and another end connected to a second connector mounted on the second control circuit board, a slit configured to be formed into which the flexible flat cable passes through, wherein the slit is formed in the image forming unit, and a regulating member configured to regulate a length of the flexible flat cable between the slit and the second connector, wherein the regulating member is attached at a predetermined position of the flexible flat cable and abuts against the image forming unit.

Further features of the present disclosure will become apparent from the following description of exemplary embodiments with reference to the attached drawings.

DESCRIPTION OF THE EMBODIMENTS

Hereinafter, an image forming apparatus 1000 according to the present disclosure will be described with reference to drawings. The scope of the application of the present technique is not limited only to the sizes, materials, shapes, and relative positions of the components described in the following exemplary embodiment, unless limitations, etc. are particularly described.

[Configuration of Image Forming Apparatus]

Figure 1:
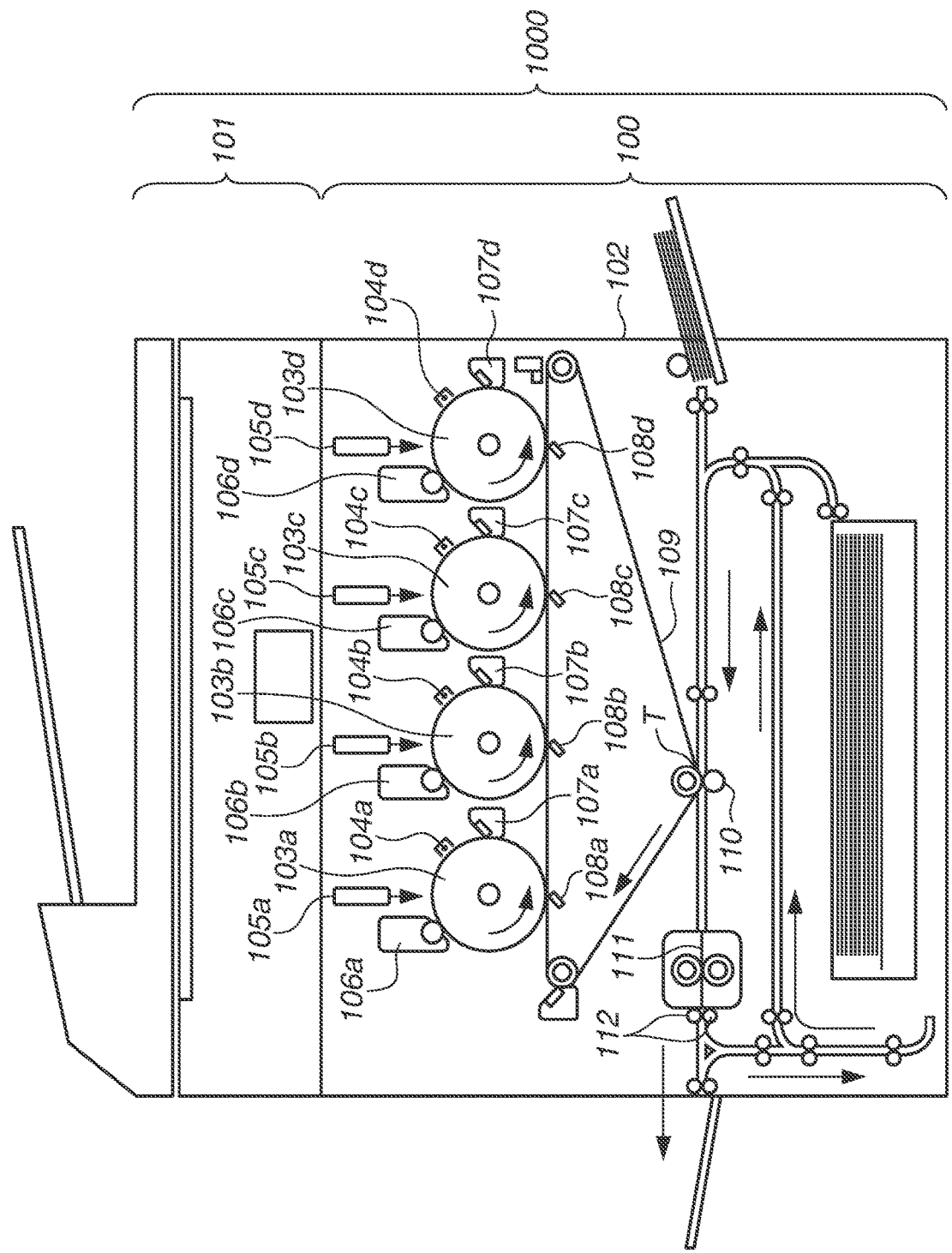
FIG. 1 illustrates an overall configuration of an image forming apparatus.

A configuration of the image forming apparatus 1000 will be described with reference to FIG. 1. FIG. 1 is a sectional view of an overall configuration of the image forming apparatus 1000 according to the present exemplary embodiment. Specifically, FIG. 1 illustrates a schematic configuration of an electrophotographic full color printer. The image forming apparatus 1000 illustrated in FIG. 1 includes an image reading device 101 and a main body 100 of the image forming apparatus 1000. The image reading device 101 is an example of an image reading unit that optically reads a document image and generates image data. The main body 100 is an example of an image forming unit that forms an image on a sheet based on the image data.

The main body 100 includes a plurality of image forming stations inside a housing 102. Specifically, the main body 100 includes image forming stations Y, M, C, and Bk for respectively forming yellow (Y), magenta (M), cyan (C), and black (Bk) toner images. The image forming station Y includes a photosensitive drum 103a, which is a photosensitive body, a charging device 104a for charging the photosensitive drum 103a, and an optical scanning device 105a for emitting laser light to form an electrostatic latent image on the charged photosensitive drum 103a. In addition, the image forming station Y includes a developing device 106a for developing the electrostatic latent image with toner and a cleaning device 107a for cleaning remaining toner on the photosensitive drum 103a. The other image forming stations have the same configuration as that of the image forming station Y.

An image forming process performed by each of the image forming stations Y, M, C, and Bk will be described. Since all the image forming stations Y, M, C, and Bk perform the same image forming process, the yellow image forming station Y will be described as an example. The photosensitive drum 103a is charged by the charging device 104a. The optical scanning device 105a has a laser emitting unit, which is a light source, and emits laser light to form an electrostatic latent image on the charged photosensitive drum 103a. This electrostatic latent image is developed with yellow toner by the developing device 106a.

The yellow toner image developed on the photosensitive drum 103a is transferred onto an intermediate transfer belt 109 by a transfer bias applied to a transfer blade 108a.

Likewise, the magenta, cyan, and black toner images on the photosensitive drums 103b to 103d are transferred onto the intermediate transfer belt 109 by transfer blades 108b to 108d. The toner images of the four colors transferred onto the intermediate transfer belt 109 are collectively transferred on a sheet by a secondary transfer roller 110 at a secondary transfer portion T. Then, after the sheet having the four-color toner image passes through a fixing device 111 and undergoes fixing processing, the sheet is discharged to the outside of the image forming apparatus 1000 by sheet discharge rollers 112, etc.

Of all the image forming stations Y, M, C, and Bk, the black image forming station Bk is disposed closest to the secondary transfer portion T in a rotation direction of the intermediate transfer belt 109. With this arrangement, the time between when a user gives an instruction for forming a monochrome image and when the monochrome image is output can be reduced.

Figure 2:
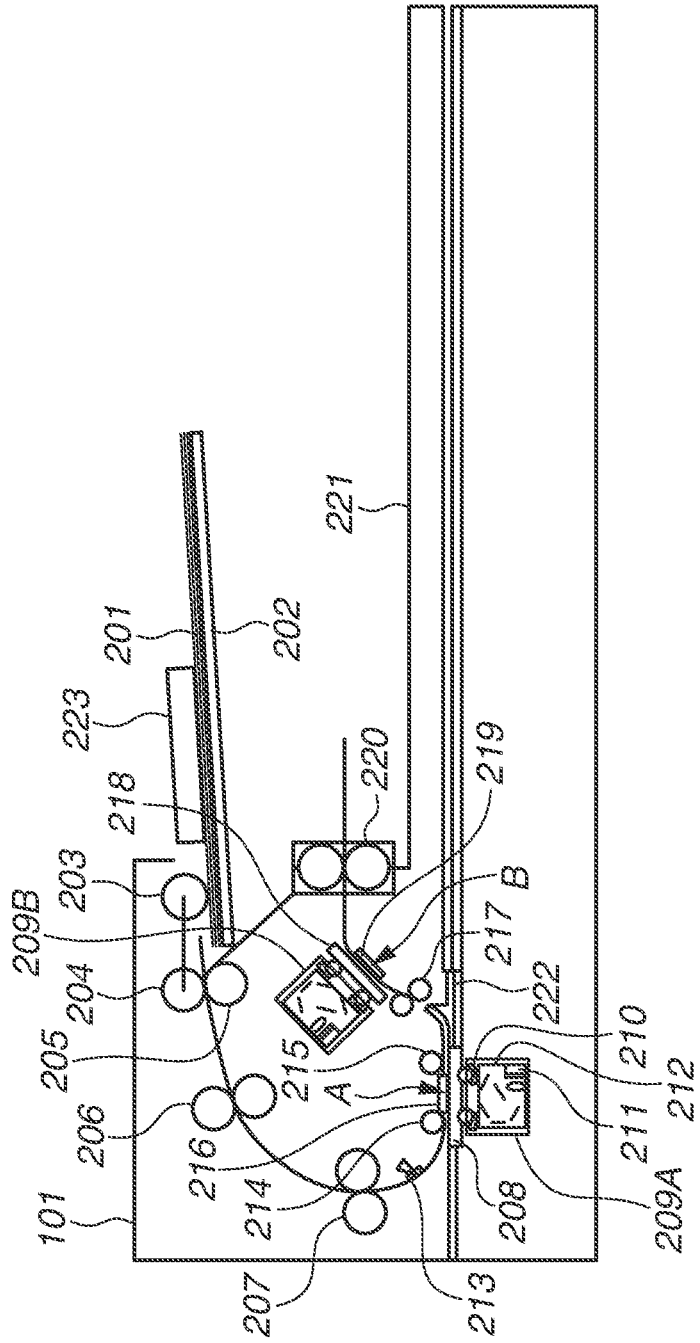
FIG. 2 is a sectional view of an image reading device.

FIG. 2 illustrates the image reading device 101 in detail. The image reading device 101 is disposed on the main body 100 illustrated in FIG. 1, reads a document image, and generates image data. The image reading device 101 includes a document tray 202 on which a plurality of documents 201 can be placed. The document tray 202 includes a side regulating plate 223 that regulates the placed documents 201 from a near side and a far side. The side regulating plate 223 moves in such a manner that the center of the documents 201 placed on the document tray 202 is adjusted to a center position. In addition, a volume resistor (not illustrated) installed inside the document tray 202 operates with the movement of the side regulating plate 223. The image reading device 101 is able to detect a width of the document 201 from a resistance value of the volume resistor.

When an instruction for the start of reading is input, a pickup roller 203 supplies the documents 201 placed on the document tray 202 into the image reading device 101 one by one sequentially from the top. The pickup roller 203 is rotated by a motor not illustrated. Since the pickup roller 203 uses only a friction force to supply the documents 201, there is a case in which the pickup roller 203 supplies a plurality of documents 201 simultaneously, depending on a friction coefficient of each document 201. Thus, a separation unit including an upper separation roller 204 and a lower separation roller 205 separates the documents 201 so that a single document 201 can be conveyed. According to the present exemplary embodiment, the upper separation roller 204 is rotated in a document conveyance direction, and the lower separation roller 205 is not rotated.

The single document 201 obtained by this separation unit including the upper separation roller 204 and the lower separation roller 205 is conveyed downstream in the conveyance direction by rotation of a pair of upstream conveyance rollers 206. Then, a pair of read rollers 207 conveys the document 201 to a front-side reading position A.

A front-side document moving-reading glass 208, which is transparent, is disposed under the front-side reading position A. Then, a front-side reading unit 209A located under the front-side document moving-reading glass 208 reads a front side of the document 201.

The front-side reading unit 209A includes a light-emitting diode (LED) 210, an image sensor 211, and a group of optical components 212. When the LED 210 illuminates the front side of the document 201, reflected light is obtained. This reflected light is reflected and collected by the group of optical components 212. Finally, the collected light is read by the image sensor 211.

In the present exemplary embodiment, the front-side reading unit 209A includes an analog-to-digital (AD) converter not illustrated. Analog image data that is output by the image sensor 211 is first converted into digital image data to be output to a read control unit 300 on a control circuit board 301, which will be described below.

The image reading device 101 includes a document detection sensor 213 that is located upstream of the front-side reading position A and that detects a tip of the document 201. The read control unit 300 starts to receive digital image data from the front-side reading unit 209A at a predetermined timing between when the document detection sensor 213 detects a tip of the document 201 and when the tip of the document 201 reaches the front-side reading position A. In addition, the read control unit 300 determines a length of the document 201 in a sub-scanning direction (the length of the document 201 in the document conveyance direction) based on a time of being "ON" of the document detection sensor 213.

If a document 201 is read while its orientation is unstable, since a distance between the front-side reading unit 209A and the document 201 is not stable, a shadow of the tip of the document 201 to be described below becomes also unstable. Thus, in the present exemplary embodiment, an upstream-side pressing roller 214 and a downstream-side pressing roller 215 are disposed to press the document 201 from above the document 201. In addition, a white front-side guide plate 216 is disposed at a position directly facing the front-side reading unit 209A between the upstream-side pressing roller 214 and the downstream-side pressing roller 215.

After passing through the front-side reading position A, the document 201 is further conveyed downstream by a pair of downstream conveyance rollers 217 to a back-side reading position B. A back-side moving-reading glass 218, which is transparent, is disposed above the back-side reading position B, and a back side of the document 201 is read by a back-side reading unit 209B above the back-side moving-reading glass 218. The back-side reading unit 209B according to the present exemplary embodiment has the same configuration as that of the front-side reading unit 209A. The front-side reading unit 209A and the back-side reading unit 209B form a reading unit 209 (see FIG. 3).

The back-side reading unit 209B is controlled by the read control unit 300. The read control unit 300 starts to receive digital image data that is output from the back-side reading unit 209B at a predetermined timing between when the document detection sensor 213 detects a tip of the document 201 and when the tip of the document 201 reaches the back-side reading position B.

A white back-side guide plate 219 is disposed at a position directly facing the back-side reading unit 209B. After passing through the back-side reading position B, the document 201 is discharged to the outside of the image reading device 101 by a pair of sheet discharge rollers 220. The discharged document 201 is placed on a discharge tray 221. On the right side of the front-side document moving-reading glass 208, a white reference plate 222 used when acquiring shading data is disposed.

Figure 3:
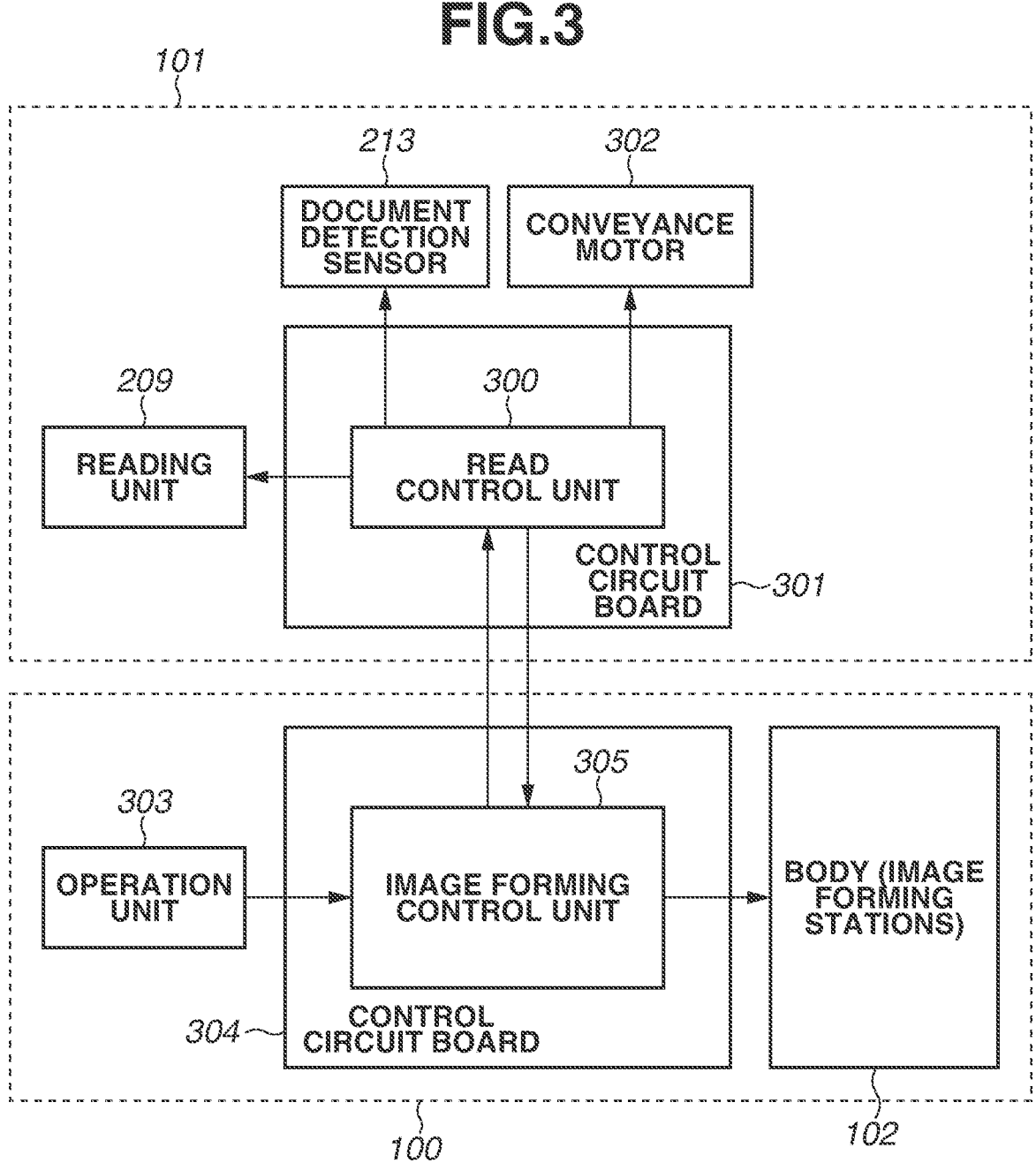
FIG. 3 is a control block diagram of the image forming apparatus.

FIG. 3 is a control block diagram of the main body 100 and the image reading device 101. The read control unit 300 is an example of a first control unit that controls the reading unit 209 and is connected to the reading unit 209, the document detection sensor 213, and a conveyance motor 302 for rotating each of the rollers for conveying the documents. The read control unit 300 is mounted on the control circuit board 301, which is an example of a first control circuit board. An operation unit 303 that receives user instructions is connected to an image forming control unit 305 on a control circuit board 304.

The image forming control unit 305 is mounted on the control circuit board 304, which is an example of a second control circuit board. The image forming control unit 305 is an example of a second control unit for controlling the main body 100. In response to a user instruction that is input from the operation unit 303, the image forming control unit 305 communicates with the read control unit 300 and starts to control the image reading device 101. When a read instruction is input from the operation unit 303, the read control unit 300 conveys the document 201 by driving the conveyance motor 302, and the reading unit 209 reads an image on the document 201. Image data generated from the read image is sent from the read control unit 300 to the image forming control unit 305. The image forming control unit 305 controls and causes the main body 100 to form an image based on the received image data.

Figure 4:
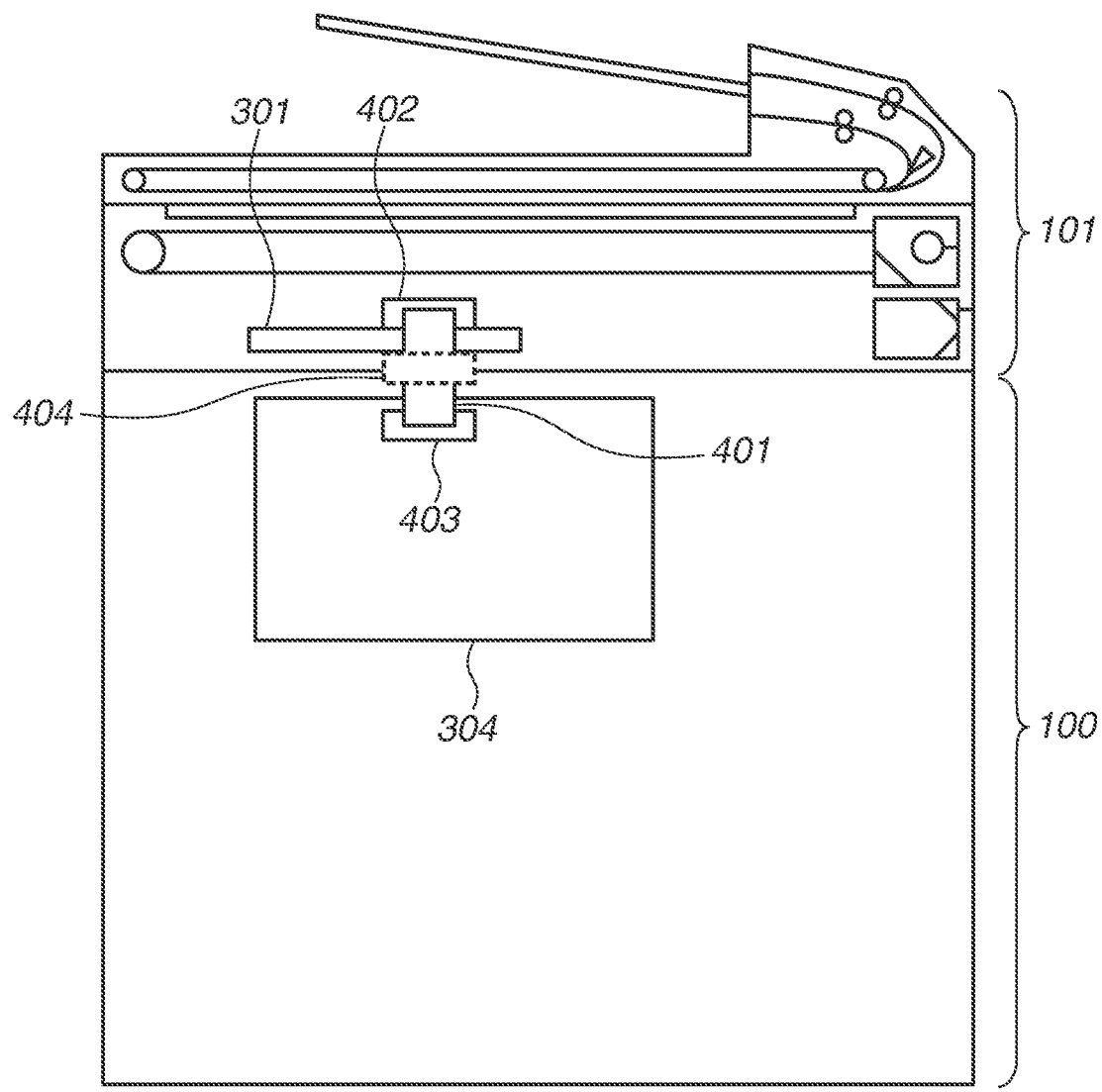
FIG. 4 is a rear view of the image forming apparatus.

FIG. 4 is a rear view of the image reading device 101 and the main body 100. As illustrated in FIG. 4, a flexible flat cable (FFC) 401 having a belt shape is vertically disposed between the control circuit board 304 and the control circuit board 301. One end of the FFC 401 is connected to a connector 402 (a first connector) on the control circuit board 301 inside the image reading device 101. The other end of the FFC 401 is connected to a connector 403 (a second connector) on the control circuit board 304 inside the main body 100. The read control unit 300 and the image forming control unit 305 are electrically connected to each other via the FFC 401. The FFC 401 is mounted perpendicularly (in a direction A in FIG. 8) to a surface on which the control circuit board 304 is mounted. The FFC 401 is used for transferring image data from the read control unit 300 to the image forming control unit 305, supplying power to the read control unit 300, and sending a drive signal to each motor, for example. The FFC 401 passes through a slit 404, which is an example of an opening formed on an upper surface of the main body 100.

Figure 5A:
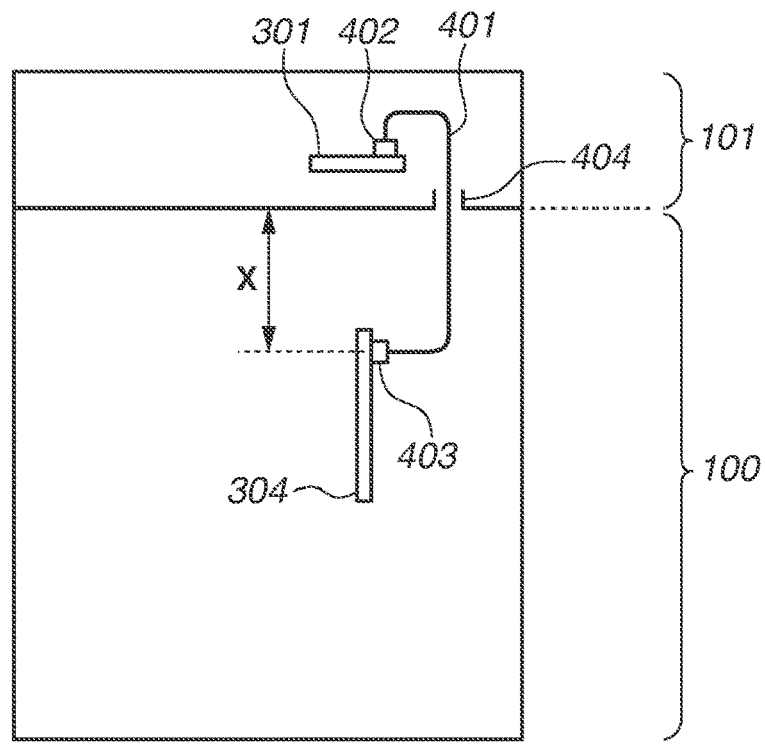
FIGS. 5A and 5B are each a side view of the image forming apparatus.
Figure 5B:
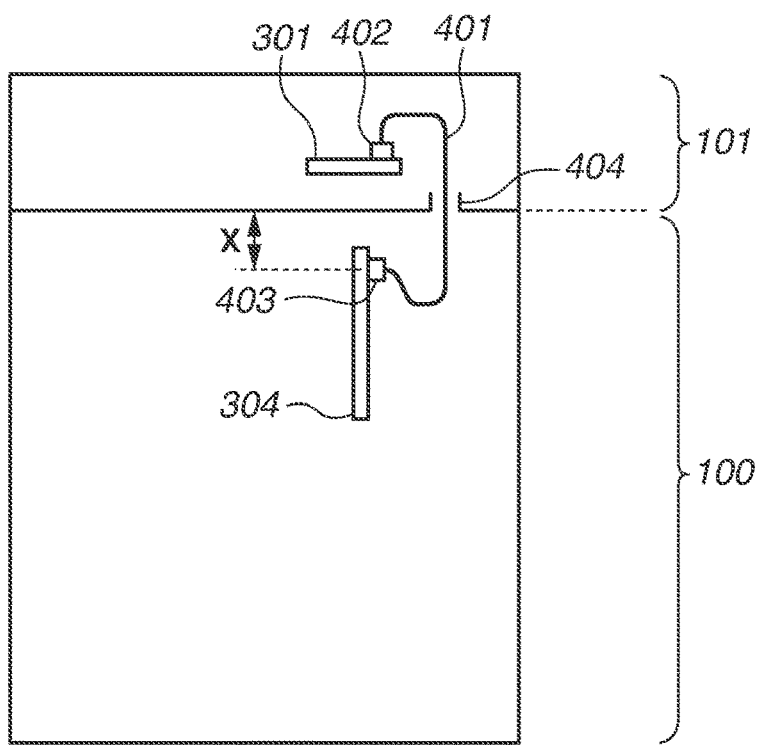

FIGS. 5A and 5B are side views of the image reading device 101 and the main body 100. Normally, an entire length of the FFC 401 is optimized to match a distance between the connector 402 mounted on the control circuit board 301 inside the image reading device 101 and the connector 403 mounted on the control circuit board 304 inside the main body 100 (see FIG. 5A). Thus, normally, the FFC does not have an extra portion. However, in the recent development of MFPs, to improve the efficiency in development, there is a case where a common image reading device 101 is used for a plurality of kinds of image forming devices having different sizes and having control circuit boards different in arrangement and configuration. In this case, since the image reading device 101 is installed on an image forming device having a shorter distance X between the slit 404 and the connector 403, an extra portion is located in the vicinity of the connector 403 on the control circuit board 304 (see FIG. 5B). As a result, stress is applied to the connector 403 or FFC 401, so that the FFC 401 may be damaged or disconnected.

Figure 6A:
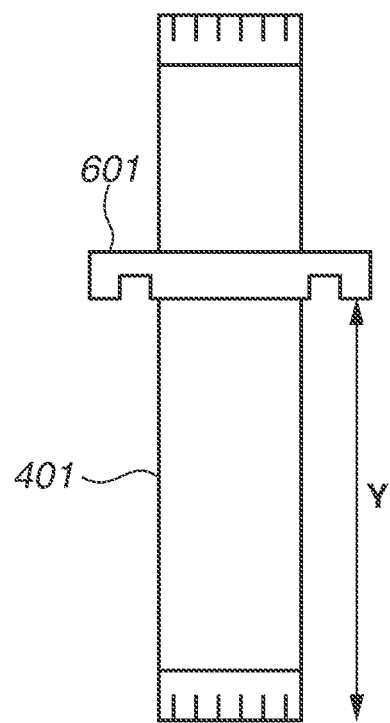
FIG. 6A illustrates a flexible flat cable (FFC) regulating member.
Figure 6B:
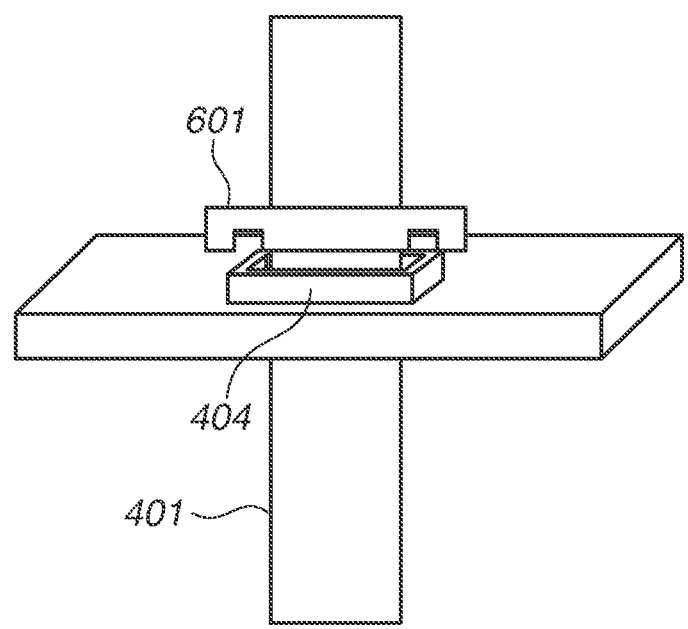
FIG. 6B illustrates the FFC regulating member and a slit of the image forming apparatus.

Thus, according to the present exemplary embodiment, as illustrated in FIG. 6A, a regulating member 601 formed by a polyethylene terephthalate (PET) sheet is attached at a predetermined position on a flat surface of the FFC 401. The regulating member 601 is formed to be longer than a side of the slit 404 (a long side of the slit 404) parallel to the FFC 401. In addition, as illustrated in FIG. 6B, the regulating member 601 has a concavo-convex shape. Specifically, the regulating member 601 has concave portions that are concave upward. These concave portions engage with a convex portion of the slit 404. In this way, the length of the FFC 401 between the slit 404 and the connector 403 is regulated.

Figure 7:
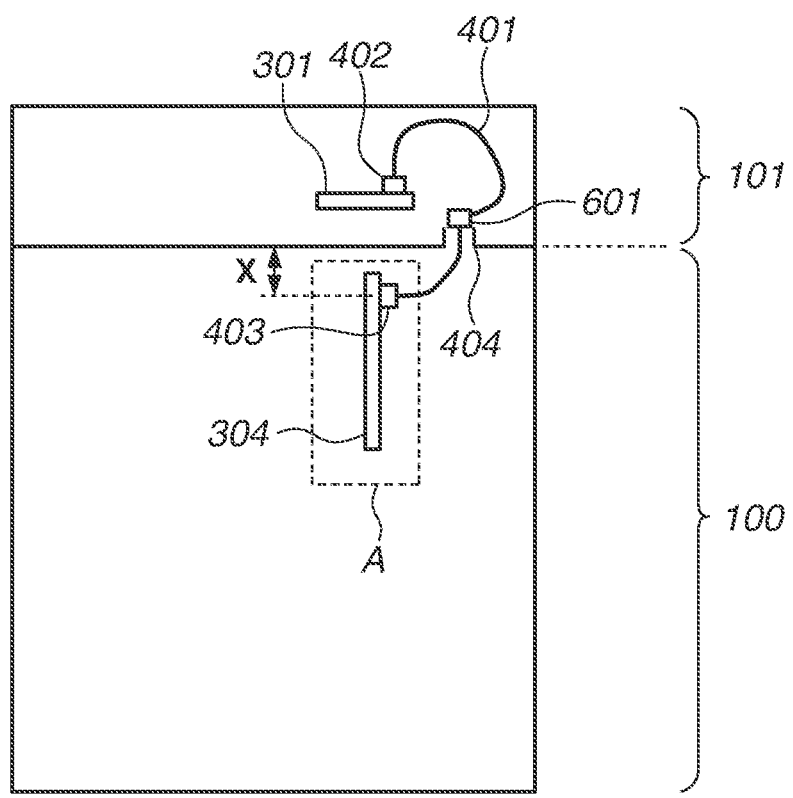
FIG. 7 is a side view of the image forming apparatus.
Figure 8:
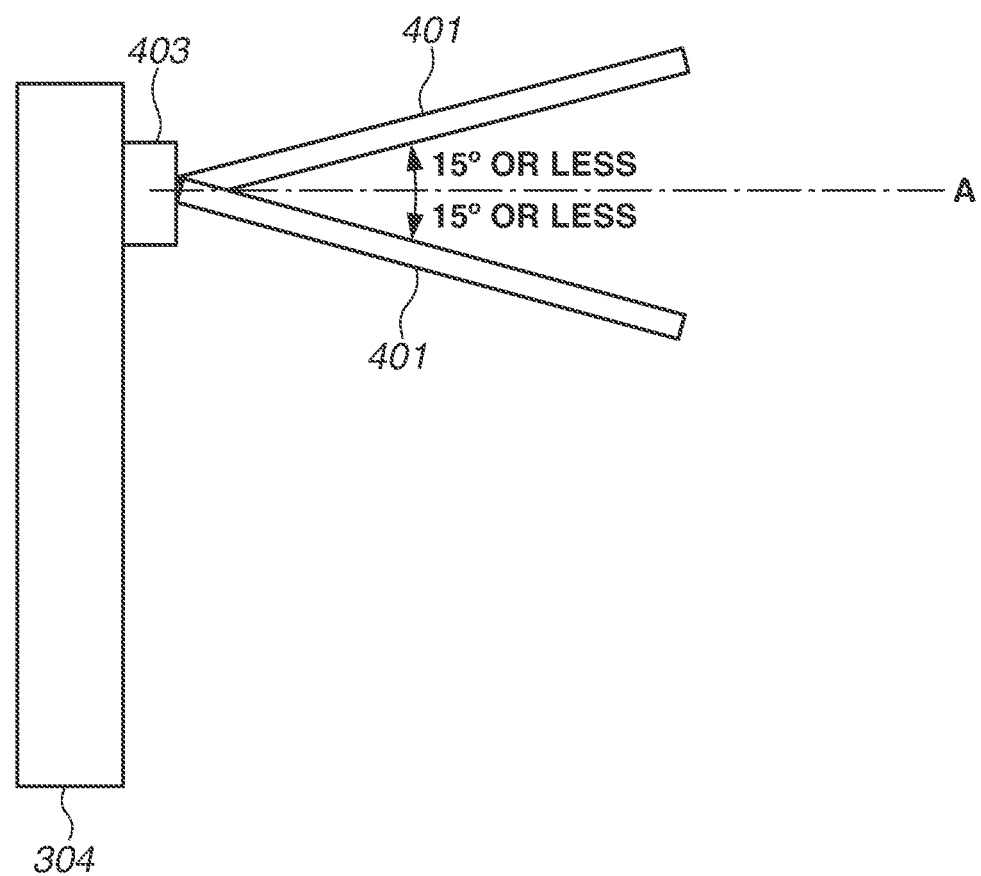
FIG. 8 illustrates a relationship between a connector and the FFC.

FIG. 7 illustrates an exemplary embodiment in which the length of the FFC 401 between the slit 404 and the connector 403 is optimized by the regulating member 601, with regard to the state of the FFC 401 illustrated in FIG. 5B. In addition, FIG. 8 is an enlarged view of a portion A in FIG. 7. The regulating member 601 engages with the convex portion of the slit 404, thereby regulating the length of the FFC 401 between the connector 403 and the slit 404, and the FFC 401 is prevented from having an extra portion in the vicinity of the connector 403. In this case, to avoid application of stress on the connector 403 and the FFC 401, it is preferable that an angle of the FFC 401 from a horizontal direction (the direction A) at a portion in the vicinity of the connector 403 be ±15 degrees or less, as illustrated in FIG. 8. Namely, a length Y (See FIG. 6A) of the FFC 401 between the connector 403 and the slit 404 is determined and the regulating member 601 is attached to a predetermined position of the FFC 401 such that the angle from the horizontal direction (the direction A) is ±15 degrees or less.

As described above, the regulating member 601 formed by the PET sheet is attached to the FFC 401. The regulating member 601 engages with an edge of the slit 404 formed on the upper surface of the main body 100 and regulates the length of the FFC 401 between the connector 403 on the control circuit board 304 and the slit 404. In this way, the length of the FFC 401 between the connector 403 and the slit 404 is shorter as compared with a case without the regulating member 601. Thus, the FFC 401 is prevented from having an extra portion in the vicinity of the connector 403 on the control circuit board 304. As a result, less stress is applied to the connector 403 on the control circuit board 304 and the FFC 401.

According to the present exemplary embodiment, a PET sheet having a concavo-convex shape is used as the regulating member 601. However, the material and the shape of the regulating member 601 are not limited to the above example. As long as the regulating member 601 abuts against an edge of the slit 404 and prevents sagging of the FFC 401, the regulating member 601 can be formed by a different material or can have a different shape.

In addition, according to the present exemplary embodiment, the width of the regulating member 601 is set to be longer than that of the FFC 401. However, the width of the regulating member 601 is not limited to this example either.

Further, according to the present exemplary embodiment, the angle of the FFC 401 with respect to the connector 403 is set to ±15 degrees or less. However, this angle is not limited to ±15 degrees or less. The attachment position of the regulating member 601 is selected such that the FFC 401 has an appropriate angle from the connector 403 based on the thickness or material of the FFC 401.

According to the present disclosure, by moving an extra portion to a position far away from a connector on a control circuit board inside an image forming unit, a cable can be prevented from being disconnected or damaged by stress.

While the present disclosure has been described with reference to exemplary embodiments, it is to be understood that the disclosure is not limited to the disclosed exemplary embodiments. The scope of the following claims is to be accorded the broadest interpretation so as to encompass all such modifications and equivalent structures and functions.

This application claims the benefit of Japanese Patent Application No. 2020-164110, filed Sep. 29, 2020, which is hereby incorporated by reference herein in its entirety.

What is claimed is:

1. An image forming apparatus comprising:
a main body including an image forming unit configured to form a sheet image on a sheet;
an image reading apparatus including an image reading unit configured to read a document image on a document, wherein the image reading apparatus is disposed on the main body;
a first control circuit board that is disposed in the image reading apparatus;
a second control circuit board that is disposed in the main body;
a regulating member; and
a flexible flat cable configured to transfer image data from the first control circuit board to the second control circuit board,
wherein the flexible flat cable has one end connected to a first connector mounted on the first control circuit board and another end connected to a second connector mounted on the second control circuit board,
wherein the main body has an opening through which the flexible flat cable runs, and
wherein the regulating member is attached to the flexible flat cable and configured to regulate a length of the flexible flat cable between the opening and the second connector by abutting the main body.

2. The image forming apparatus according to claim 1, wherein the flexible flat cable is mounted on the second connector in a direction perpendicular to a surface of the second control circuit board.

3. The image forming apparatus according to claim 1, wherein an angle of a portion, which is connected to the second connector, of the flexible flat cable is 15 degrees or less with respect to a horizontal direction.

4. The image forming apparatus according to claim 1,
wherein the opening is formed on an upper surface of the main body, and
wherein the regulating member abuts against an edge of the opening.

5. The image forming apparatus according to claim 4,
wherein the regulating member has a concave portion that is concave upward, and the edge of the opening has a convex portion that protrudes from the upper surface of the main body, and
wherein the concave portion of the regulating member engages with the convex portion of the opening, so that the length of the flexible flat cable between the opening and the second connector is regulated.

6. The image forming apparatus according to claim 1,
wherein the image reading apparatus includes a conveyance roller configured to convey the document and a transparent member, and
wherein the image reading unit reads the document image on the document conveyed by the conveyance roller through the transparent member.

* * * * *